United States Patent [19]

Bacher et al.

[11] Patent Number: 5,510,030

[45] Date of Patent: Apr. 23, 1996

[54] FILTER APPARATUS FOR FLOWABLE MATERIAL

[76] Inventors: Helmut Bacher, Bruck/Hausleiten 17; Helmuth Schulz, Badstrasse 20, both of St. Florian; Georg Wendelin, Waldbothenweg 84, Linz, all of Austria

[21] Appl. No.: 256,814

[22] PCT Filed: Feb. 12, 1993

[86] PCT No.: PCT/AT93/00019

§ 371 Date: Jul. 25, 1994

§ 102(e) Date: Jul. 25, 1994

[87] PCT Pub. No.: WO93/15819

PCT Pub. Date: Aug. 19, 1993

[30] Foreign Application Priority Data

Feb. 14, 1992 [AT] Austria ........................... A256/92

[51] Int. Cl.[6] ........................................ B01D 33/46
[52] U.S. Cl. ........................... 210/397; 210/402; 425/197
[58] Field of Search .................... 210/396, 397, 210/784, 433.1, 402; 425/197–199; 100/116, 145; 277/203; 415/174

[56] References Cited

U.S. PATENT DOCUMENTS

| | | | |
|---|---|---|---|
| 821,194 | 5/1906 | Sheak | 210/397 |
| 2,439,463 | 4/1948 | Bebauer | 210/402 |
| 2,560,142 | 7/1951 | Tucker | 210/402 |
| 2,920,347 | 1/1960 | Joukainen et al. | 415/171.1 |

FOREIGN PATENT DOCUMENTS

| | | |
|---|---|---|
| 78064 | 5/1983 | European Pat. Off. . |
| 164004 | 12/1985 | European Pat. Off. . |
| 3706352 | 9/1988 | Germany . |
| 2027605 | 2/1980 | United Kingdom . |

*Primary Examiner*—Matthew O. Savage
*Attorney, Agent, or Firm*—Salter & Michaelson

[57] ABSTRACT

A filter apparatus for synthetic plastics material melts containing impurities comprises a housing (1) in which a cylindrical or conical filter element (3) is bearingly supported for rotation around its longitudinal axis (4) by a drive means (8). The outer periphery (15) of the filter element (3) is engaged by a scraper element (20) which surrounds the filter element (3) along a helix line or a spiral line. The material to be filtered is supplied from the outside through an inlet opening (12) to the filter element (3). The filtered material penetrates openings (18) of the filter element (3) and flows into a central hollow space (17) thereof wherefrom it is carried off through a discharge opening (18). The impurities cannot pass the opening (16), gather on the outer periphery (15) of the filter element (3) and are carried by the stillstanding scraper element (20) towards an exit (24). Thereby a reliable construction is achieved which requires less effort (FIG. 1).

15 Claims, 3 Drawing Sheets

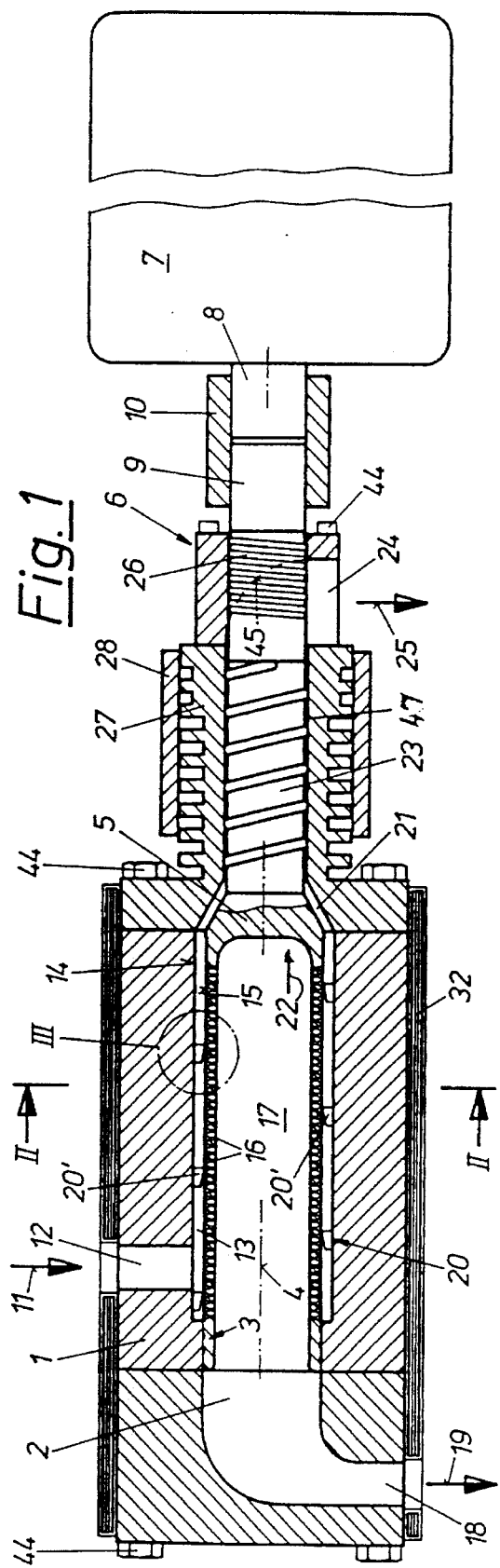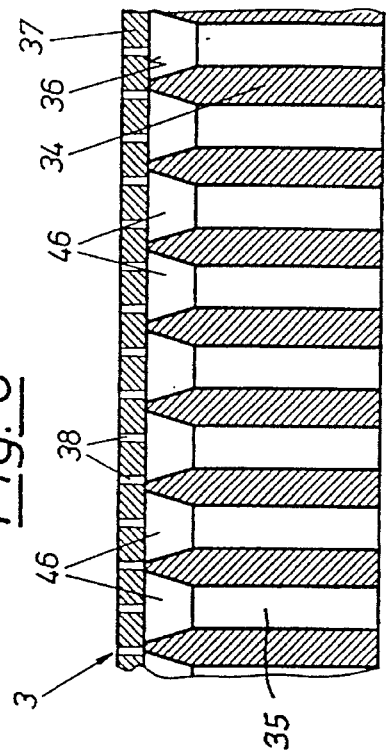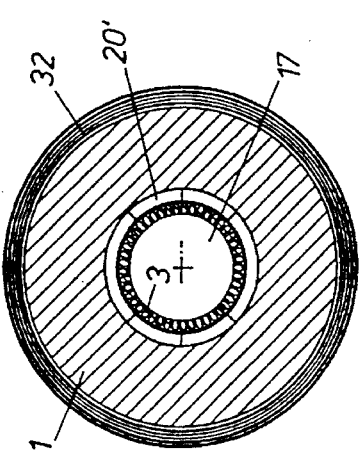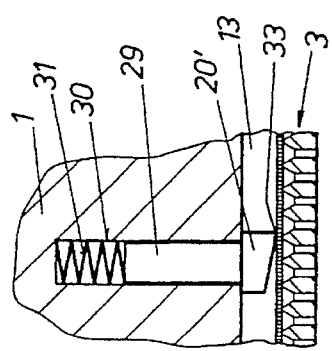

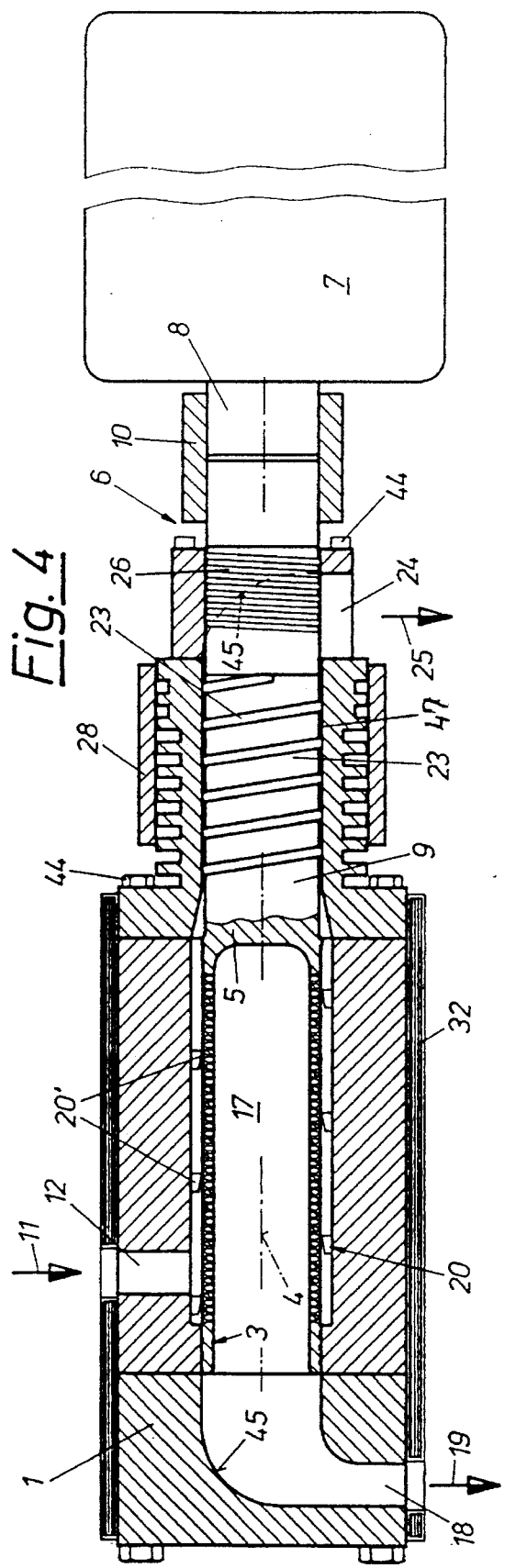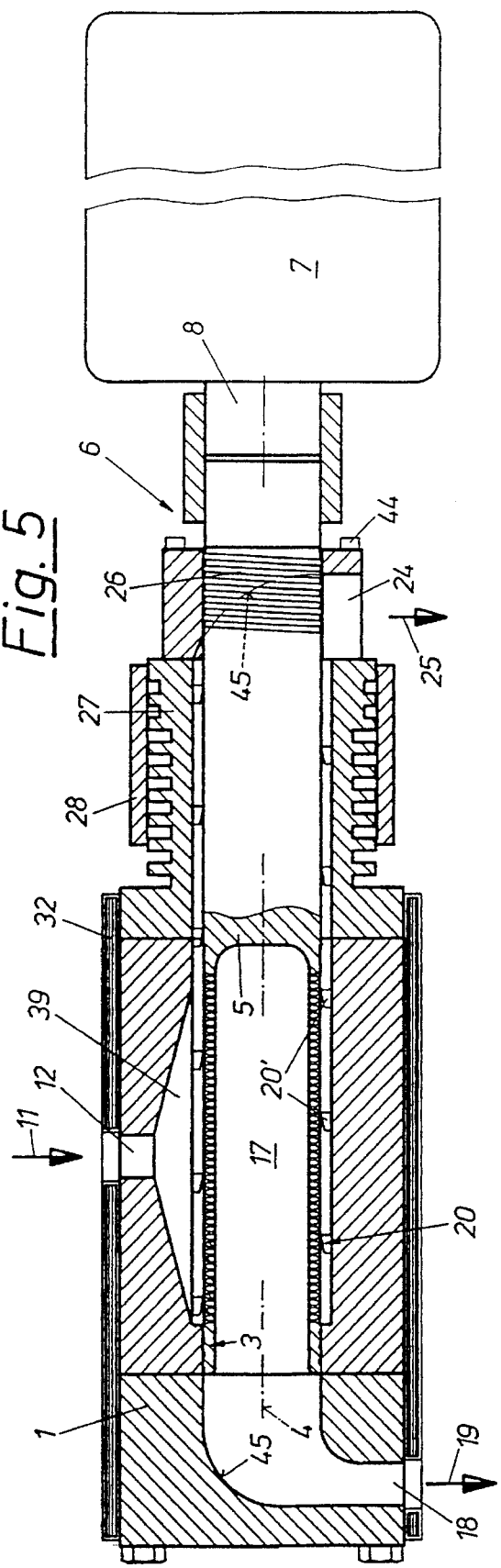

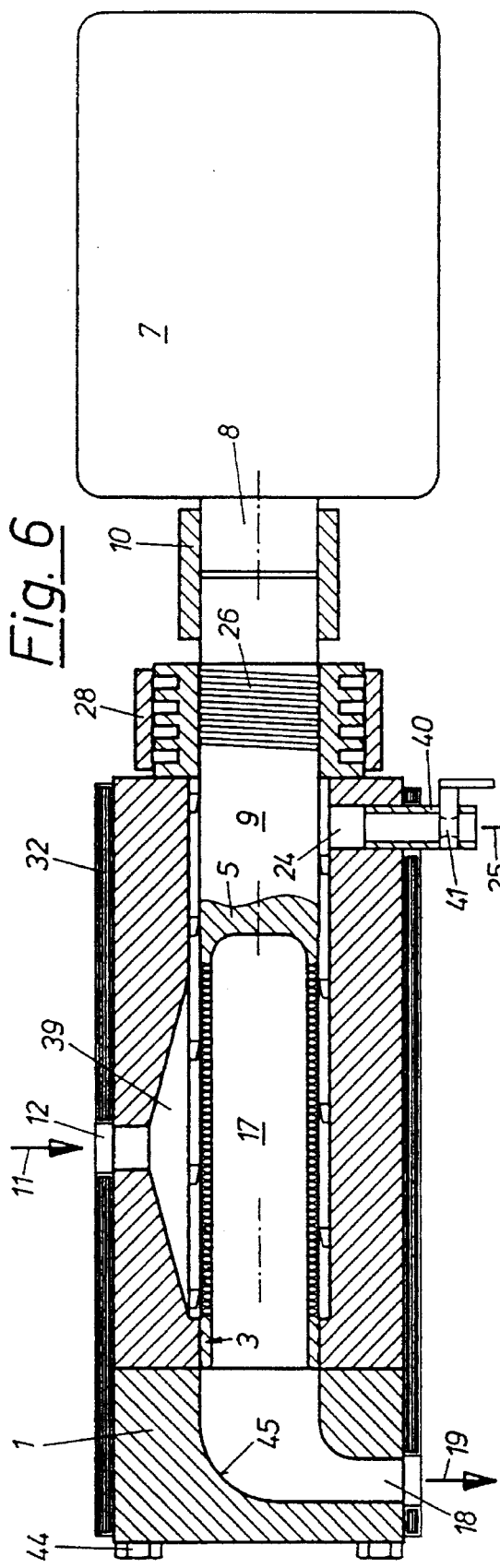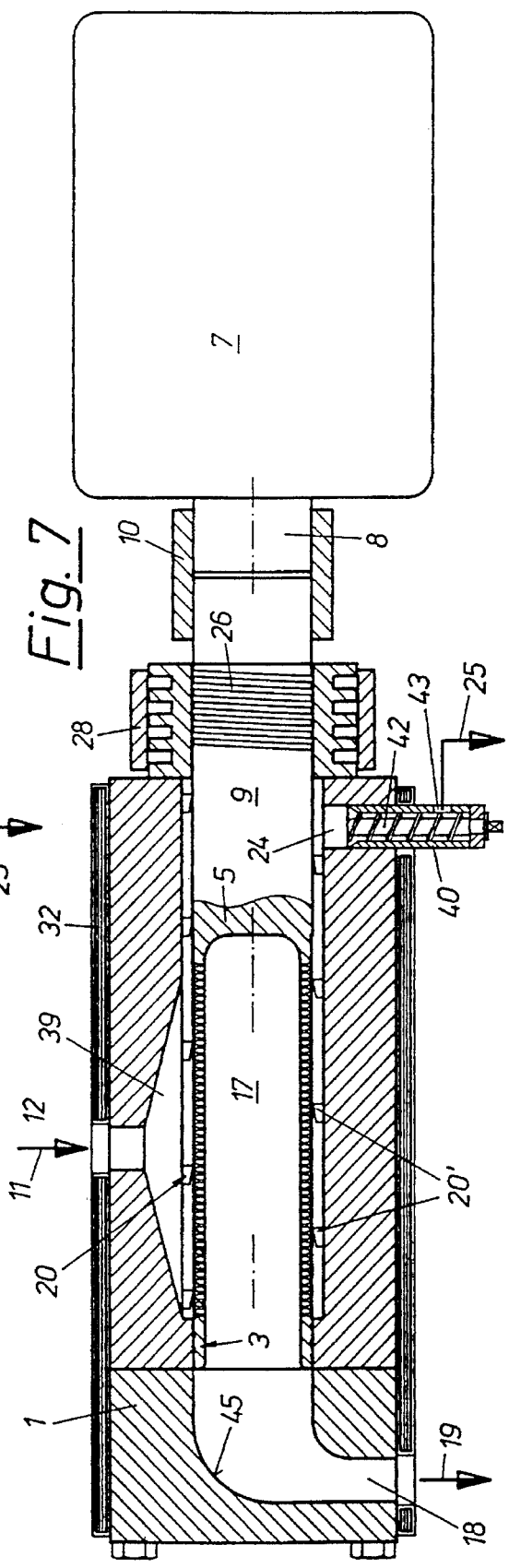

FILTER APPARATUS FOR FLOWABLE MATERIAL

The invention relates to a filter apparatus for flowable material containing solid particles, in particular to synthetic plastics melts containing impurities, comprising a housing in which a filter element is disposed, said filter element being rotational symmetrical to an axis and having on its periphery a plurality of penetration openings similar to holes for the filtered matter, said housing comprising an inlet opening for supplying the material to be filtered to the filter element to the outer side of its periphery, so that the filtered material penetrates the filter element from the outside to an inner hollow space being in flow connection with an outlet opening of the housing, whereas for a continuous removal of the residual matter from the periphery of the filter element a scraper element is provided which is disposed coaxially to the filter element and engages the outer periphery of the filter element and follows its curvature, so that the residual matter is carried through an annular gap disposed between the filter element and the housing with a component of its motion directed in axial direction of the filter element towards a separate exit, and wherein the filter element for its rotation around its axis is connected to a drive means.

A filter apparatus of this kind is known for a mud suction carriage (EP-A 164,004).

Another filter apparatus has become known from the EP-A 411,163. Within this known construction a flange disposed at one front end of the filter element is fixed to the housing and scraper element that is wound around the outer periphery of the filter element in form of a spiral strip is rotated by means of a driving shaft around the axis of the hollow cylindrical filter element. Thereby, on the one hand, the residual matter is scraped off the outer periphery of the filter element, and, on the other hand, the residual matter is conveyed towards the exit opening of the housing. This known construction has the disadvantage that the scraper element that is helically wound around the filter element tends to adhere to the outer periphery surface of the filter element, because reaction forces act onto this scraper element which are caused by the impurities taken off and by the friction between the filter element and the scraper element wound around it. If one tries to avoid this disadvantage by a correspondingly increased gap between the inner surface of the helical strip and the outer periphery of the filter element, then the scraping effect of the spiral strip is no more sufficient. This disadvantage can reliably be avoided only then if the spiral strip is provided with a great wall thickness, but this is of detrimental influence upon the entire dimension, in particular to the outer diameter of the housing accommodating the filter element. Further, no self adjustment is possible in order to obtain a clearance-free interaction between the filter element and the scraper element.

The invention has at its object to reliably avoid the described disadvantages without increasing the diameter of the housing. The invention solves this task by the features that the scraper element is divided into several partial elements, which are resiliently abutted in radial direction of the filter element within the housing confining the annular gap on its outside, and each of which engages the filter element along a helix section or a spiral line section only over a section of the axial length of the filter element and is hold in the housing secured against rotation, the partial elements, however, extending along a single-flight or multiple-flight helix or spiral line. Whereas, therefore, within the lastly described known construction the filter element stands still and the spiral-shaped scraper element is rotated, within the inventive construction the disposition is inverse, that means, the filter element is rotated and the partial elements of the scraper element stand still. Thus, the scraper element can no more jam, neither to the filter element nor to the housing and the scraper element can be disposed so thin that the annular space between the outer periphery of the filter element and the inner periphery of the housing is just sufficient to reliably move-off the impurities. Thereby and by the partial embedding of the partial elements of the scraper element in the wall of the housing, an increase of the housing diameter is avoided. This advantage is also given in comparison with the construction according to the initially mentioned EP-A 164,004 as well as in comparison to a further known construction (EP-A 78084) in which the scraper element in form of several hydraulically resiliently abutted partial elements engages the filter element from the inner side.

Within the inventive construction, there are no difficulties to rotate the filter element around its longitudinal axis, and for doing this, the filter element must not be particularly thick. The subdivision of the scraper element into several partial elements distributed over the length of the filter element enables one, if proper adjustment is given, to obtain different scraping effects over different parts of the filter element and/or to obtain the desired clearance between the filter element and the partial elements of the scraper element without any problem.

The invention enables one to maintain the geometric structure of the known filter elements, or to change it in the first case, according to the invention, the filter element is of hollow cylindrical shape and is connected at its one, closed front end to the shaft of a drive means, if desired by means of a coupling. In the last case, according to the invention, the filter is of conical or frusto-conical shape and is connected at its one end to the shaft of a drive means. As a rule, the first named construction is to be preferred by clearness purposes and by the ground of a more simple construction.

Within the spirit of the invention, a resilient action of the partial elements of the scraper element onto the filter element can be obtained by abutting the partial elements of the scraper element resiliently in radial direction of the filter element, preferably by means of pressure springs engaging the scraper element from the outside. For this, a particularly suitable construction consists according to the invention in that each partial element carries at least one radially disposed pin on its outer surface, which pin is guided in a radial bore of the housing and is pressed inwardly by a spring inserted between the end of this bore and the front end of the pin.

Suitably, the exit opening is disposed in the region of that front end of the filter element that does not face the discharge opening for the filtered material. In the region of the exit opening and/or in the channel, a conveyor element, in particular a screw, can be provided for transporting off the impurities. In such a manner, the scraper element or its partial elements by which the transport of the impurities to the exit opening is made, are relieved from reaction forces. This screw, according to a preferred embodiment of the invention, can be constituted by a section of the driving shaft, said section at the same time serving as a sealing. This section may according to the invention, be surrounded by a cooling means for the purpose to transport the impurities to the outside in a cooled condition.

The material to be filtered is supplied under pressure and pressurizes the closed front end of the filter element, so that these forces tend to shift the filter element in direction of the pressure force. This pressure can be compensated at least partially by the feature that the driving shaft connected to the front end of the filter element has a smaller diameter than the outer diameter of the cylindrical filter element. By the so formed annular surface a counter-pressure is exerted that makes the said compensation.

Since the filter element within the inventive construction has to withstand the torsion exerted by the driving shaft, a particular suitable embodiment within the spirit of the invention consists in that the filter element consists of a screen carrier member radially penetrated by a plurality of channels, the outer periphery of this screen carrier member being engaged by a cylindrical screen which is provided with a plurality of openings, the diameter of which being smaller than that of the channels. The real filter action, therefore, is done by the screen openings of the screen element, the impurities being scraped off from the outer periphery of the screen element by the scraper element or its sections, respectively. The screen element can be shrunk on the screen carrier member in a simple manner.

The inventive construction is particularly suitable for filtering synthetic plastics material melts, in particular in the recycling field. However, it can also be used with advantage in other technical fields where solid particles must be filtered from a liquid carrying these particles, for example fruit juices, for the filtration of oils and so on.

In the drawings embodiments of the invention are schematically shown by way of examples.

FIG. 1 shows a longitudinal section through a first embodiment.

FIG. 2 shows a section along the line II—II of FIG. 1.

FIG. 3 shows the detail III of FIG. 1 in a greater scale.

FIGS. 4 to 7 each show a further embodiment in longitudinal section.

FIG. 8 shows a section through a section of the filter element in an enlarged scale.

Within the embodiment according to FIG. 1 a substantially hollow cylindrical housing I is provided, in the hollow space 2 of which a substantially cylindrical filter element 3 is bearingly supported for rotation around its longitudinal axis 4. This filter element 3 is closed on its one front end 5 and is there connected for common rotation to the shaft 8 of a drive means 6. This drive means 6 comprises a motor 7 provided with a gearing, the driven shaft 8 thereof is coupled by means of a coupling 10 to a shaft 9 connected to the front end 5 of the filter element 3. The material to be filtered is introduced in direction of the arrow 11 through an inlet opening 12 into the housing 1 and enters there a narrow annular gap 13 between the inner periphery surface 14 of the housing 1 and the outer periphery surface 15 of the filter element 3. This filter element 3 is provided with a plurality of penetration openings 16 for the filtered material, which openings are constituted by holes that are so small that the impurities to be removed from the material to be filtered are retained. The filtered material penetrates the penetration openings 16 and reaches the cylindrical hollow space of the filter element 3 connected to a discharge opening 18 of the housing 1 through which the filtered material leaves the apparatus in direction of the arrow 19. The impurities retained by filter element 3 gather on the outer periphery surface 15 of the filter element 3 and are transported from there by means of a stillstanding scraper element 20 in direction towards the closed front end 5 of the filter element 3. For this, the scraper element 20 extends in partial elements 20' in the manner of a helix line around the outer surface 15 of the filter element 3, suitably with a constant lead of the helix line. Each one of the partial elements 20', therefore, engages with its scraping edge the filter element 3 along a short section of the helix line, the scraping edges, therefore, follow the curvature of the filter element 3. All scraping edges of the single partial elements 20' are directed to the same side, so that all partial elements move the residual matter towards the closed front end of the filter element 3. All partial elements of the scraper element 20 are secured on the housing 1 against being taken along by the filter element, therefore, the partial elements 20' do not rotate together with the filter element. By the rotation of the filter element 3 along its longitudinal axis 4, however, a component of the motion directed in direction of the axis 4 is exerted on the impurities in addition to the scraping action, which component transports the impurities towards the front end 5. The impurities reach there a frusto-conical annular space 21 which is formed by the fact that the shaft 9 has a smaller diameter than the outer peripheral surface 15 of the filter element 3. This reducing of the diameter has the following sense: The material to be filtered is supplied under pressure through the inlet opening 12 and has sufficient pressure also within the hollow space 17 in order to exert a substantial pressure component in direction of the arrow 22 onto the closed front end 5 of the filter element 3, so that the material to be filtered tries to shift the filter element 3 and the shaft 9 connected thereto to right (FIG. 1). This pressure can at least partially be compensated by the counter-pressure exerted onto the frusto-conical section of the front end 5 of the filter element by the also pressurized impurities which are carried away in the annular space 21. This counter-pressure is supported by the counter-pressure of a screw 23 which constitutes a section of the driving shaft 9. In such a manner the ideal condition, that means no axial forces, can be obtained, if the dimensions are proper chosen. The housing of the screw 23 forms a channel 47 for carrying off the impurities which are transported by the screw 23 from the annular space 21 through the channel 47 towards an exit 24 which extends laterally from the housing of the screw 23 and through which the impurities discharge in direction of the arrow 25. In that section of the shaft 9 which with respect to the exit 24 is disposed opposite the screw 23, a further screw 26 is provided which has a direction of threads opposite to that of the screw 23 so that it acts as a sealing. The section 27 of the housing 1 that surrounds the screw 23 may be provided on its outer periphery with cooling ribs and, in addition thereto, with a cooling means 28.

The scraper element 20 with its partial elements may follow a single-flight helix having a constant lead. However, this scraper element 20 may also be multiple threaded. In each case, the partial elements 20' of the scraper element 20 are secured on the housing and always engage the filter element 3 only along a section of the axial length thereof. Each of these partial elements 20' is resiliently supported within the housing 1 so that in a proper disposition all of these partial elements 20' engage the outer peripheral surface 15 of the filter element 3 with the same pressure. For this, each partial element 20' carries at least one radially disposed pin 29 (FIG. 3) which is guided in its longitudinal direction within a radial bore 30 of the housing 1. The bore 30 is closed at its one end and a pressure spring 31 engages this end and tries to press the pin 29 and therefore the related partial element 20' of the scraper element 20 inwardly in radial direction. If desired, the pressure of the spring 31 may be adjustable, suitably by means of an adjustable abuttment member. The single partial elements 20' of the scraper elements have front surfaces facing the filter element 3 and being chamfered in transport direction so that the edge 33 exerting a scraper action onto the filter element 3 faces the closed front end 5 of the filter element 3.

The housing 1 may on its outside be surrounded by a heating strip 32 in order to maintain the temperature of the supplied synthetic plastics material melt at the desired temperature.

In FIG. 8 the construction of the filter element 3 is shown in detail. It has a screen carrier member 34 that is penetrated by a plurality of radial channels 35 for the filtered material. The outer surface 38 of the screen carrier member 34 is engaged by a screen cylinder 37 that has a thickness which is smaller in comparison to that of the screen carrier member 34, the screen cylinder suitably being shrunk onto the screen carrier member 34. The screen cylinder 37 has openings 38, the number of which is greater than that of the channels 35. The openings 38 may be produced by laser machining. The diameter of the openings 38 is substantially smaller than that of the channels 35 so that the openings 38 can be passed by the synthetic plastics material melt only, but not by the impurities thereof. Suitably, the channels 35 enlarge towards the screen carrier member 37 in order to make as much openings effective as possible. The enlargements 48 of the channels 35 can be produced in a simple manner by machining screw threads, particularly having a trapezoidal cross section, or annular grooves at the outer surface 36 of the screen carrier member 34. The screen member 37 is then fixed to the crests of these screw threads or, respectively, to the ribs remaining between the annular grooves.

Within the embodiment according to FIG. 4, the rotating filter element 3 and the shaft 9 which in a section is formed as a screw 23, have substantially the same outer diameter. If the reaction force exerted onto the shaft 9 to the left (FIG. 4) by the screw 23 is not sufficiently great, there will be an axial force acting onto the filter element 3 towards the right, a corresponding pressure of the material supplied via the inlet opening 12 provided. It is to be recommended therefore, to use such an apparatus only then, if the pressure of the supplied material to be cleaned is low.

According to the embodiment of FIG. 5, the inlet opening 12 of the housing 1 is provided with an enlargement 39 facing the filter element 3 and extending in axial direction of the filter element 3 over nearly the entire length thereof. Such an enlargement which is formed like a slot in the housing 1, forms a distributor for the material supplied which distributes this material over the entire length of the filter element 3. This enhances the filter action of the filter element 3. Further, the scraper element 12 or, respectively, its partial elements 20' continue into the section 27 of the housing 1 up to the exit opening 24, so that the scraper element 20 carries out also the discharge of the deposited impurities. Therefore, the screw 23 can be omitted. A limited counter thrust onto the filter element 3 towards the left can take place by the worm 26 serving as a sealing.

The embodiment according to FIG. 6 is similar to that of FIG. 5, but the exit 24 for the impurities is disposed closer to the closed front end 5 of the filter element 3 and—when seen in flowing direction of the impurities—is disposed before the cooling means 28. This causes that the impurities are quicker carried off. Further, a tube 40 is inserted into the exit 24, and a valve 41 is disposed in that end of the tube 40 that protrudes from the housing 1 or, respectively, from the heating strip 32. Thereby, the impurities carried off can be drained off in portions.

The embodiment according to FIG. 7 is similar to that of FIG. 6, however, a conveyor element in form of a screw 42 driven by a separate drive means is disposed within the tube 40 instead of the valve 41, and this screw 42 carries off the impurities to the outside through an outlet opening 43 disposed at the side of the tube 40.

For reasons of a simple assembling, in all embodiments the housing 1 is composed of at least two parts connected to each other by means of screws 44. Thereby it is possible to produce in the housing 1 curved guide walls 45 leading to the laterally extending openings 18, 24, which guide walls produce a smooth deviation of the stream of the flowing material and prevent, therefore, that single portions of the treated material remain for a longer -time within the apparatus and by this are thermically damaged. Within the embodiments according to FIGS. 6 and 7 the guide wall 45 is omitted in the region of the exit 24.

We claim:

1. Filter apparatus for filtering a flowable material containing solid particle impurities comprising:

a housing including a cylindrical internal cavity, said cavity having first and second opposite ends and a cylindrical inner surface, an inlet opening extending through said cylindrical inner surface for pressurized introduction of said flowable material into said cavity, an outlet opening for filtered material at said first end, a cylindrical outlet passage having opposite first and second ends and a cylindrical inner surface, wherein the first end of said passage is in communication with the second end of said cavity and the second end is open, and an exit opening for solid particle impurities extending through the cylindrical inner surface of said outlet passage adjacent the second end thereof;

a hollow cylindrical filter element received in said cavity, said filter element including an open end adjacent said outlet opening of said housing and a closed end adjacent said outlet passage, said filter element being rotationally symmetrical with respect to its longitudinal axis and having a plurality of openings in a peripheral surface thereof for receiving said flowable material, said flowable material passing through said plurality of openings into said hollow space wherein said solid particle impurities are retained on said peripheral surface of said filter element within an annular gap formed between said outer peripheral surface of said filter element and the cylindrical inner surface of said cavity, said filter element comprising a cylindrical screen carrier member having a plurality of channels extending radially with respect to said longitudinal axis of said filter element, and further comprising a screen member received over the outer periphery of the screen carrier member, said screen member having a thickness that is less than said screen carrier member and further having a plurality of openings which have a diameter which is less than the diameter of said channels;

drive means for rotating said filter element around its longitudinal axis, said drive means including a drive shaft connected to the closed end of said filter element for rotation thereof, said drive shaft extending through the second open end of said outlet passage and including threads on an outer peripheral surface thereof, wherein said threads are positioned adjacent a portion of the cylindrical inner surface of said outlet passage that is adjacent to said exit opening and the second open end of said outlet passage, said threads acting as a seal so that said solid particle impurities which are carried toward said exit opening leave said housing through said exit opening; and a plurality of arcuate scraper elements individually mounted to the cavity wall of the housing, each of said scraper elements including an arcuate scraping edge which extends into said annular gap and engages the peripheral surface of said filter element for removing said solid particle impurities from said peripheral surface, said scraper elements being mounted to said cavity wall such that said arcuate scraping edges of said scraper elements are disposed along a helical line which extends around the peripheral surface of the filter element, said helical line being arranged for guiding said impurities toward said exit opening as said filter element is rotated; and means for securing each of said scraper elements against rotation in said housing.

2. Filter apparatus for filtering a flowable material containing solid particle impurities comprising:

a housing including an internal cavity, an inlet opening for pressurized introduction of said flowable material into said cavity, and outlet opening, and an exit opening;

a filter element received in said cavity, said filter element including a hollow space therein which is in communication with said outlet opening of said housing, said filter element being rotationally symmetrical with respect to its longitudinal axis and having a plurality of openings in a peripheral surface thereof for receiving said flowable material, said flowable material passing through said plurality of openings into said hollow space wherein said solid particle impurities are retained on said peripheral surface of said filter element within an annular gap formed between said outer peripheral surface of said filter element and a wall of said cavity;

drive means for rotating said filter element around its longitudinal axis;

a plurality of individual scraper elements having at least of portion thereof mounted in a respective bore in the cavity wall of the housing, each of said scraper elements including an arcuate scraping edge which extends into said annular gap and engages the peripheral surface of said filter element for removing said solid particle impurities from said peripheral surface, said scraper elements being mounted to said cavity wall such that said arcuate scraping edges of said scraper elements are disposed along a helical line which extends around the peripheral surface of the filter element, said helical line being arranged for guiding said impurities toward said exit opening as said filter element is rotated;

means for securing each of said scraper elements against rotation in said housing; and a spring received in each of said bores for resiliently biasing said scraper element into engagement with said filter element.

3. Filter apparatus for filtering a flowable material containing solid particle impurities comprising:

a housing including an internal cavity having a longitudinal axis, said housing further including an inlet opening for pressurized introduction of said flowable material into said cavity, an outlet opening, and an exit opening;

a filter element received in said cavity, said filter element including a hollow space therein which is in communication with said outlet opening of said housing, said filter element being rotationally symmetrical with respect to its longitudinal axis and having a plurality of openings in a peripheral surface thereof for receiving said flowable material, said flowable material passing through said plurality of openings into said hollow space wherein said solid particle impurities are retained on said peripheral surface of said filter element within an annular gap formed between said outer peripheral surface of said filter element and a wall of said cavity;

drive means for rotating said filter element around its longitudinal axis; and a plurality of scraper elements disposed in said annular gap, each of said scraper elements including a body portion having at least a portion thereof slidably received in a respective bore in the cavity wall of the housing, said bores extending radially outwardly with respect to the longitudinal axis of the housing, said body of said scraper element further including an arcuate scraping edge which extends into said annular gap and engages the peripheral surface of said filter element for removing said solid particle impurities from said peripheral surface, said scraper elements being arranged within said annular gap such that said arcuate scraping edges of said scraper elements are disposed along a helical line which extends around the peripheral surface of the filter element, said helical line being arranged for guiding said impurities toward said exit opening as said filter element is rotated;

means for securing each of said scraper elements against rotation in said housing;

a spring received in each of said radial bores for resiliently biasing said scraper element into engagement with said filter element.

4. In the filter apparatus of claim 3, said scraper elements being disposed in end-to-end abutting relation along said helical line so that said arcuate scrap edges form a continuous helical screw.

5. In the filter apparatus of claim 3, said filter element comprising a hollow cylinder having a closed front end which is connected to a shaft of said drive means.

6. In the filter apparatus of claim 5, said drive shaft having a reduced diameter portion at the junction where said drive shaft is connected to said filter element.

7. In the filter apparatus of claim 3, said body portion of said scraper element which extends into said bore comprising a pin which extends outwardly from said body portion, said pin being received in said respective radially extending bore in said cavity wall of said housing, said spring being captured between an end wall of said bore and said pin for biasing said scraper element radially inwardly.

8. The filter apparatus of claim 3 further comprising means in said exit opening for carrying off said impurities.

9. In the filter apparatus of claim 8, said means for carrying off said impurities comprising an extrusion screw.

10. In the filter apparatus of claim 3, said drive means including a drive shaft which extends through said exit opening, said drive shaft including outwardly facing extrusion screw threads for carrying off said impurities.

11. In the filter apparatus of claim 10, said housing including cooling means surrounding said extrusion screw portion of said drive shaft.

12. In the filter element of claim 3, said inlet opening including an enlargement which faces said filter element, said enlargement extending in the axial direction of the filter element over a substantial part of its length.

13. In the filter apparatus of claim 3, said filter element comprising a screen carrier member having a plurality of channels which extend radially with respect to the longitudinal axis of the filter element, and a screen member received over the outer periphery of the screen carrier member, said screen member having a thickness that is less than said screen carrier member and further having a plurality of openings which have a diameter that is less than the diameter of said channels.

14. In the filter apparatus of claim 13, said channels having a tapered portion which tapers outwardly from a smaller dimension adjacent the longitudinal axis of the filter element to a larger dimension adjacent the screen member.

15. In the filter apparatus of claim 13, said screen carrier member including screw threads on the outer peripheral surface thereof, said screen member being affixed to the crests of said screw threads.

* * * * *